United States Patent
Jung et al.

(10) Patent No.: US 10,524,297 B2
(45) Date of Patent: Dec. 31, 2019

(54) METHOD FOR DEVICE-TO-DEVICE (D2D) OPERATION PERFORMED BY TERMINAL IN WIRELESS COMMUNICATION SYSTEM AND TERMINAL USING THE METHOD

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 15/304,202

(22) PCT Filed: Apr. 23, 2015

(86) PCT No.: PCT/KR2015/004079
§ 371 (c)(1),
(2) Date: Oct. 14, 2016

(87) PCT Pub. No.: WO2015/163716
PCT Pub. Date: Oct. 29, 2015

(65) Prior Publication Data
US 2017/0034865 A1    Feb. 2, 2017

Related U.S. Application Data

(60) Provisional application No. 61/983,439, filed on Apr. 23, 2014, provisional application No. 61/983,999, (Continued)

(51) Int. Cl.
*H04W 76/14* (2018.01)
*H04W 76/10* (2018.01)
(Continued)

(52) U.S. Cl.
CPC ........... *H04W 76/14* (2018.02); *H04W 72/02* (2013.01); *H04W 76/10* (2018.02); *H04W 76/18* (2018.02);
(Continued)

(58) Field of Classification Search
CPC ...... H04W 76/14; H04W 76/27; H04W 76/38
See application file for complete search history.

(56) References Cited

U.S. PATENT DOCUMENTS

2012/0082105 A1    4/2012    Hwang et al.
2013/0109301 A1    5/2013    Hakola et al.
(Continued)

FOREIGN PATENT DOCUMENTS

CN    103079262    5/2013
CN    103139930    6/2013
(Continued)

OTHER PUBLICATIONS

Korean Intellectual Property Office Application No. 10-2016-7028663, Notice of Allowance dated Nov. 1, 2018, 2 pages.
(Continued)

*Primary Examiner* — Phirin Sam
*Assistant Examiner* — Debebe A Asefa
(74) *Attorney, Agent, or Firm* — Lee Hong Degerman Kang & Waimey

(57) ABSTRACT

Provided are a method for device-to-device (D2D) performed by a terminal in a wireless communication system and a terminal using the method. The method is characterized by: delivering data related to D2D operation from an upper layer to a lower layer from among protocol layers of the terminal; starting a timer when the data is delivered; and transmitting a D2D signal using an exception resource, when the timer expires.

2 Claims, 20 Drawing Sheets

Related U.S. Application Data filed on Apr. 24, 2014, provisional application No. 61/988,928, filed on May 6, 2014.

(51) Int. Cl.
| | |
|---|---|
| *H04W 76/27* | (2018.01) |
| *H04W 76/20* | (2018.01) |
| *H04W 76/19* | (2018.01) |
| *H04W 76/18* | (2018.01) |
| *H04W 72/02* | (2009.01) |
| *H04W 88/02* | (2009.01) |
| *H04W 88/08* | (2009.01) |
| *H04W 8/00* | (2009.01) |

(52) U.S. Cl.
CPC ........... *H04W 76/19* (2018.02); *H04W 76/20* (2018.02); *H04W 76/27* (2018.02); *H04W 8/005* (2013.01); *H04W 88/02* (2013.01); *H04W 88/08* (2013.01)

(56) References Cited

U.S. PATENT DOCUMENTS

| | | | |
|---|---|---|---|
| 2013/0324114 A1* | 12/2013 | Raghothaman | H04W 8/005 455/426.1 |
| 2014/0066001 A1 | 3/2014 | Lee | |
| 2014/0094183 A1 | 4/2014 | Gao et al. | |
| 2015/0264677 A1 | 9/2015 | He et al. | |
| 2015/0264733 A1 | 9/2015 | Guo et al. | |
| 2015/0271763 A1* | 9/2015 | Balachandran | H04B 17/18 370/338 |
| 2015/0365994 A1 | 12/2015 | Yu et al. | |
| 2016/0142898 A1* | 5/2016 | Poitau | H04W 76/14 370/329 |
| 2016/0323870 A1* | 11/2016 | Wei | H04W 72/042 |
| 2016/0374135 A1 | 12/2016 | Martin | |
| 2017/0026939 A1 | 1/2017 | Fodor et al. | |
| 2017/0188403 A1 | 6/2017 | Jung et al. | |
| 2017/0188408 A1 | 6/2017 | Jung et al. | |
| 2017/0353848 A1 | 12/2017 | He et al. | |

FOREIGN PATENT DOCUMENTS

| | | |
|---|---|---|
| KR | 1020130035964 | 4/2013 |
| WO | 2013162333 | 10/2013 |
| WO | 2014010988 | 1/2014 |
| WO | 2014014323 A1 | 1/2014 |
| WO | 2014047905 | 4/2014 |

OTHER PUBLICATIONS

3rd Generation Partnership Project (3GPP), "Technical Specification Group Radio Access Network; Study on Device to Device Proximity Services; Radio Aspects (Release 12)," 3GPP TR 36.843 V1.2.0, Feb. 2014, 49 pages.
Ericsson, "Seamless switching of D2D transmission modes", 3GPP TSG RAN WG2 Meeting #85bis, R2-141261, Apr. 2014, 4 pages.
U.S. Appl. No. 15/305,068, Office Action dated Feb. 7, 2018, 21 pages.
U.S. Appl. No. 15/305,067, Office Action dated Feb. 7, 2018, 21 pages.
State Intellectual Property Office of the People's Republic of China Application Serial No. 201580022471.5, Office Action dated Nov. 20, 2018, 7 pages.
Interdigital Communications, "Mode Selection and Resource Pool Selection for D2D UEs", 3GPP TSG RAN WG2 Meeting #85bis, R2-141695, Apr. 2014, 5 pages.
3rd Generation Partnership Project, "Technical Specification Group Radio Access Network; Evolved Universal Terrestrial Radio Access (E-URTA); User Equipment (UE) procedures in idle mode (Release 8)", 3GPP TS 36.304 V8.5.0, Mar. 2009, 30 pages.
U.S. Appl. No. 15/305,068, Notice of Allowance dated Jun. 25, 2018, 25 pages.
The State Intellectual Property Office of the People's Republic of China Application No. 201580021100.5, Office Action dated Dec. 29, 2018, 6 pages.
Korean Intellectual Property Office Application No. 10-2016-7028663, Office Action dated May 18, 2018, 5 pages.
InterDigital Communications, "Mode Selection and Resource Pool Selection for D2D UEs," 3GPP TSG-RAN WG2 Meeting #85bis, R2-141695, Mar. 31-Apr. 4, 2014, 5 pages.

\* cited by examiner

METHOD FOR DEVICE-TO-DEVICE (D2D) OPERATION PERFORMED BY TERMINAL IN WIRELESS COMMUNICATION SYSTEM AND TERMINAL USING THE METHOD

CROSS-REFERENCE TO RELATED APPLICATIONS

This application is the National Stage filing under 35 U.S.C. 371 of International Application No. PCT/KR2015/004079, filed on Apr. 23, 2015, which claims the benefit of U.S. Provisional Application Nos. 61/983,439, filed on Apr. 23, 2014, 61/983,999, filed on Apr. 24, 2014 and 61/988,928, filed on May 6, 2014, the contents of which are all hereby incorporated by reference herein in their entirety.

BACKGROUND OF THE INVENTION

Field of the Invention

The present disclosure relates to wireless communication, and more particularly, to a method for device-to-device (D2D) operation performed by a terminal in a wireless communication system, and a terminal using the method.

Related Art

In an International Telecommunication Union Radio communication sector (ITU-R), a standardization of International Mobile Telecommunication (IMT)-Advanced being a next mobile communication system after a third generation has been performed. The IMT-Advanced is aimed at supporting an Internet Protocol (IP) based multi-media service with a data transmission rate of 1 Gbps in a stop and low speed moving state and a data transmission rate of 1 Gbps in a high speed moving state.

A 3rd Generation Partnership Project (3GPP) is preparing LTE-Advanced (LTE-A) being an improved one of Long Term Evolution (LTE) based on an OFDMA(Orthogonal Frequency Division Multiple Access)/SC-FDMA(Single Carrier-Frequency Division Multiple Access) transmission scheme as a system standard satisfying requirements of IMT-Advanced. The LTE-A is one important candidate for IMT-Advanced.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, an D2D operation.

The D2D operation may be signal transmission/reception between adjacent devices to have various advantages. For example, a D2D terminal may perform data communication with a high transmission rate and low delay. Further, the D2D operation may distribute traffic converged in a base station. If the D2D terminal serves as a relay, the D2D terminal may serve to extend coverage of a base station.

Meanwhile, a terminal has a protocol including a plurality of layers. When the terminal transmits data, the data is delivered between multiple protocol layers. In the case where the terminal transmits data related to device-to-device (D2D) operation, the transmission of the data may stop for a certain time. In this case, it may not be desirable for the terminal to transmit the data using the same resource. D2D operation is closely related to common security, and thus, a method of improving reliability of the D2D operation is needed.

SUMMARY OF THE INVENTION

The objective of the present disclosure is to provide a method for device-to-device (D2D) operation performed by a terminal in a wireless communication system, and a terminal using the method.

In an aspect, a method for device-to-device (D2D) operation performed by a user equipment (UE) in a wireless communication system is provided. The method comprises transmitting data related to D2D operation from an upper layer among protocol layers of the UE to a lower layer, starting on a timer when the data is transmitted and transmitting a D2D signal using an exception resource when the timer is expired.

The timer may stop when the UE completes transmission of the data to a different UE.

The exception resource may be selected by the UE from a predetermined resource pool.

The upper layer may be a Radio Resource Control (RRC) layer, and the lower layer is Packet Data Convergence Protocol (PDCP) layer.

The D2D operation may be D2D communication.

In another aspect, a user equipment (UE) is provided. The UE comprises a Radio Frequency (RF) unit that transmits and receives a wireless signal and a processor configured to operate in conjunction with the RF unit, wherein the processor that: transmits data related to device-to-device (D2D) operation from an upper layer to a lower layer from among protocol layers of the UE, starts on a timer when the data is transmitted, and transmits a D2D signal using an exception resource when the timer is expired.

According the present disclosure, a timer starts whenever data for device-to-device (D2D) operation is delivered between protocol layers inside a terminal, and, if the data is not transmitted to a different terminal even after the timer is expired, the terminal transmits the data for D2D operation using an exception resource other an existing resource. In this manner, D2D operation may be performed continuously. As a result, operation reliability of a network supporting the D2D operation may be improved.

DESCRIPTION OF EXEMPLARY EMBODIMENTS

Figure 1:
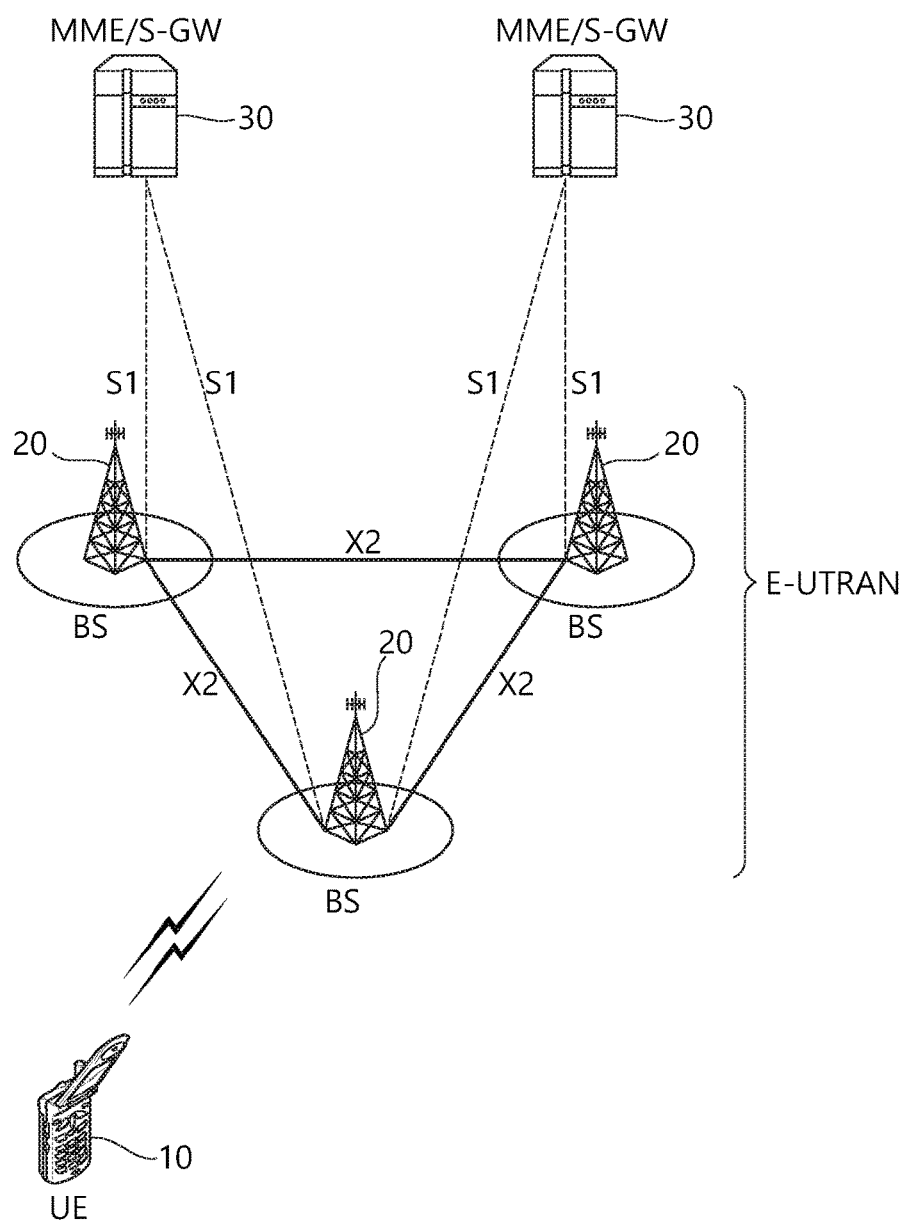
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
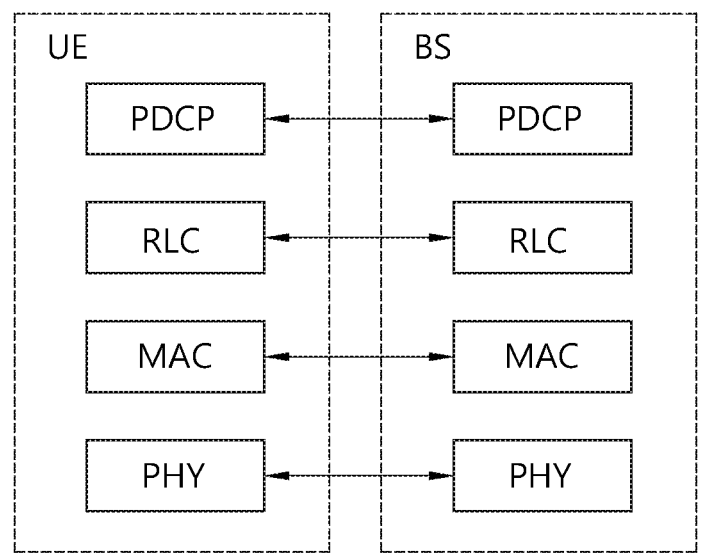
FIG. 2 is a diagram showing a wireless protocol architecture for a user plane.
Figure 3:
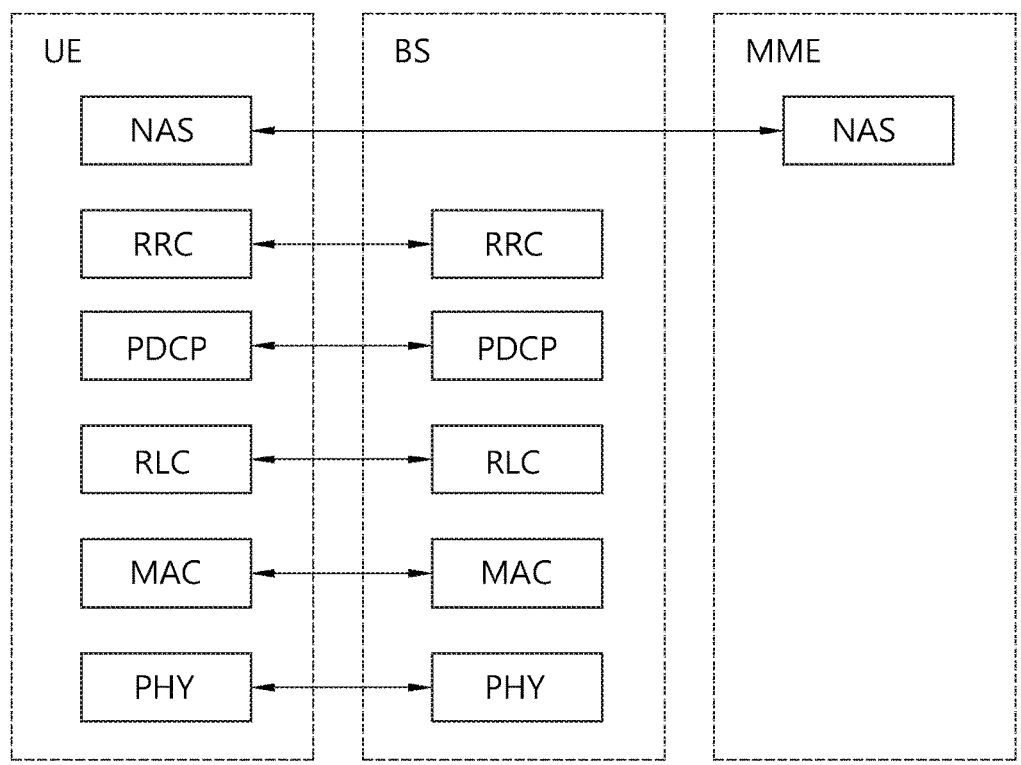
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
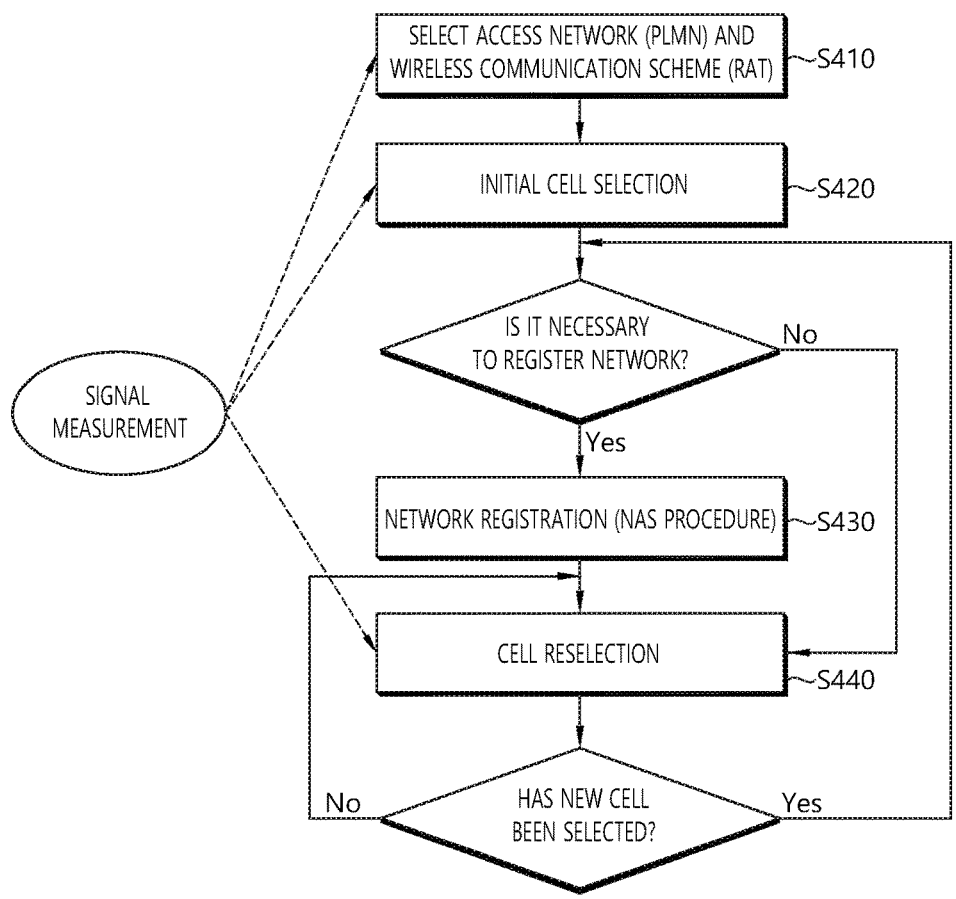
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
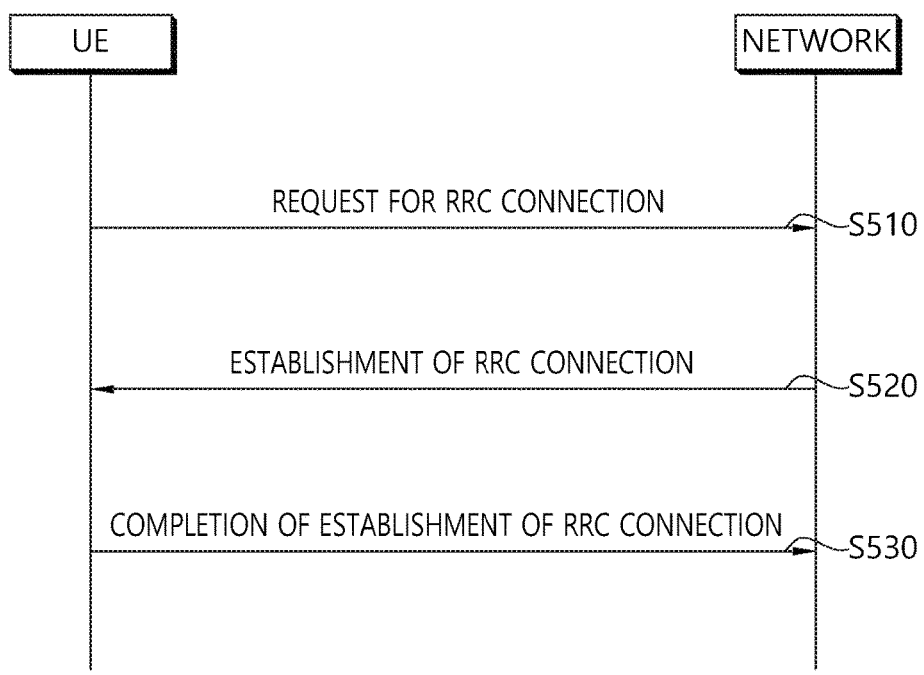
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
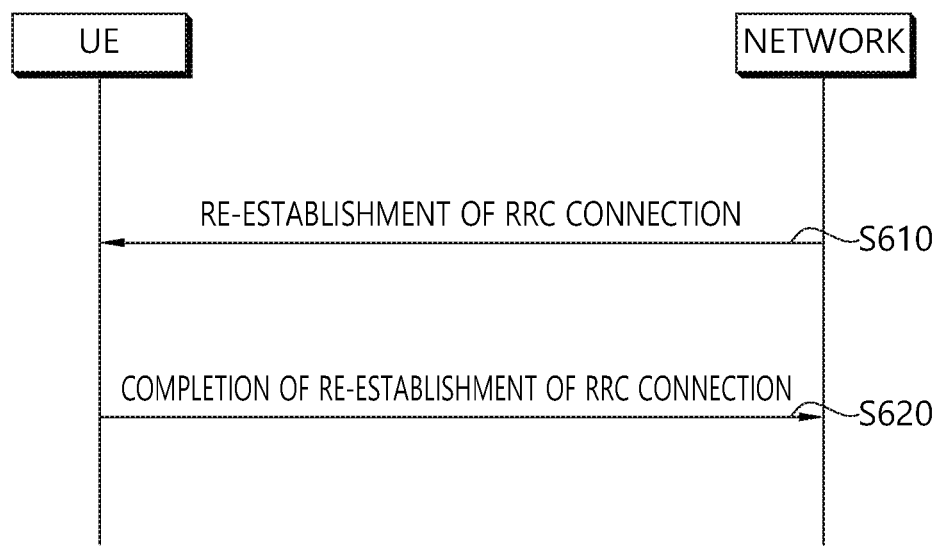
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below.

$$S\text{rxlev} > 0 \text{ AND } S\text{qual} > 0, \qquad [\text{Equation 1}]$$

where:

$$S\text{rxlev} = Q_{rxlevmeas} - (Q_{rxlevmin} + Q_{rxlevminoffset}) - P_{compensation},$$

$$S\text{qual} = Q_{qualmcas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |

TABLE 1-continued

| | |
|---|---|
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX}-P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, \quad R_n = Q_{meas,n} - Q_{offset} \quad \text{[Equation 2]}$$

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE
   A case where uplink transmission is problematic because a random access procedure continues to fail in the MAC sublayer.
   A case where uplink transmission is problematic because uplink data transmission continues to fail in the RLC sublayer.
   A case where handover is determined to have failed.
   A case where a message received by UE does not pass through an integrity check.

An RRC connection re-establishment procedure is described in more detail below.

Figure 7:
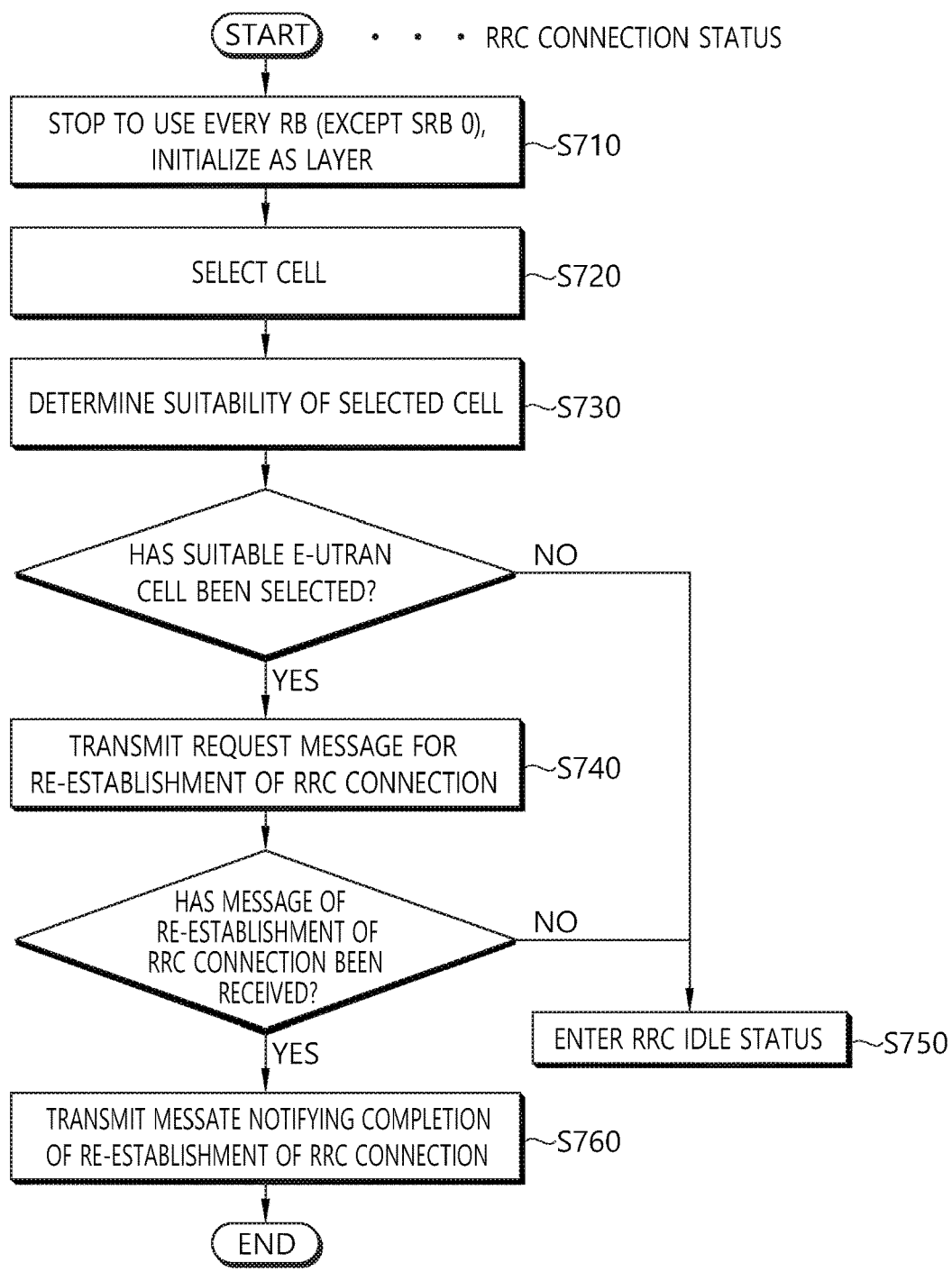
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
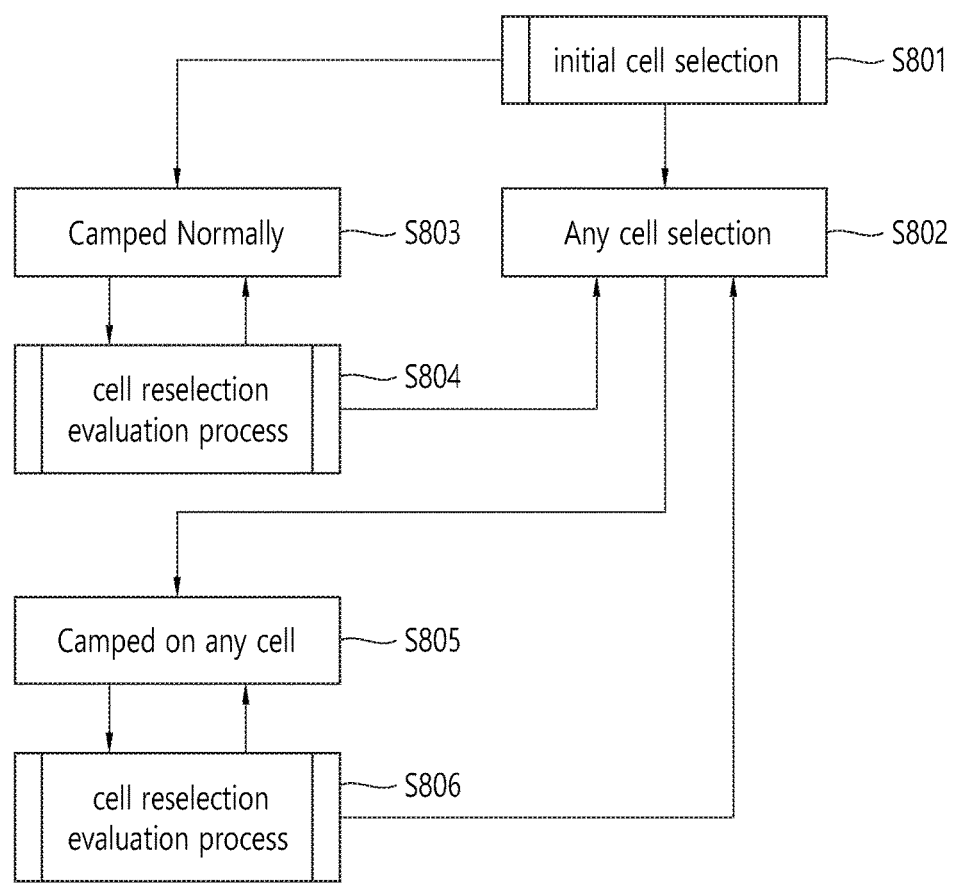
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
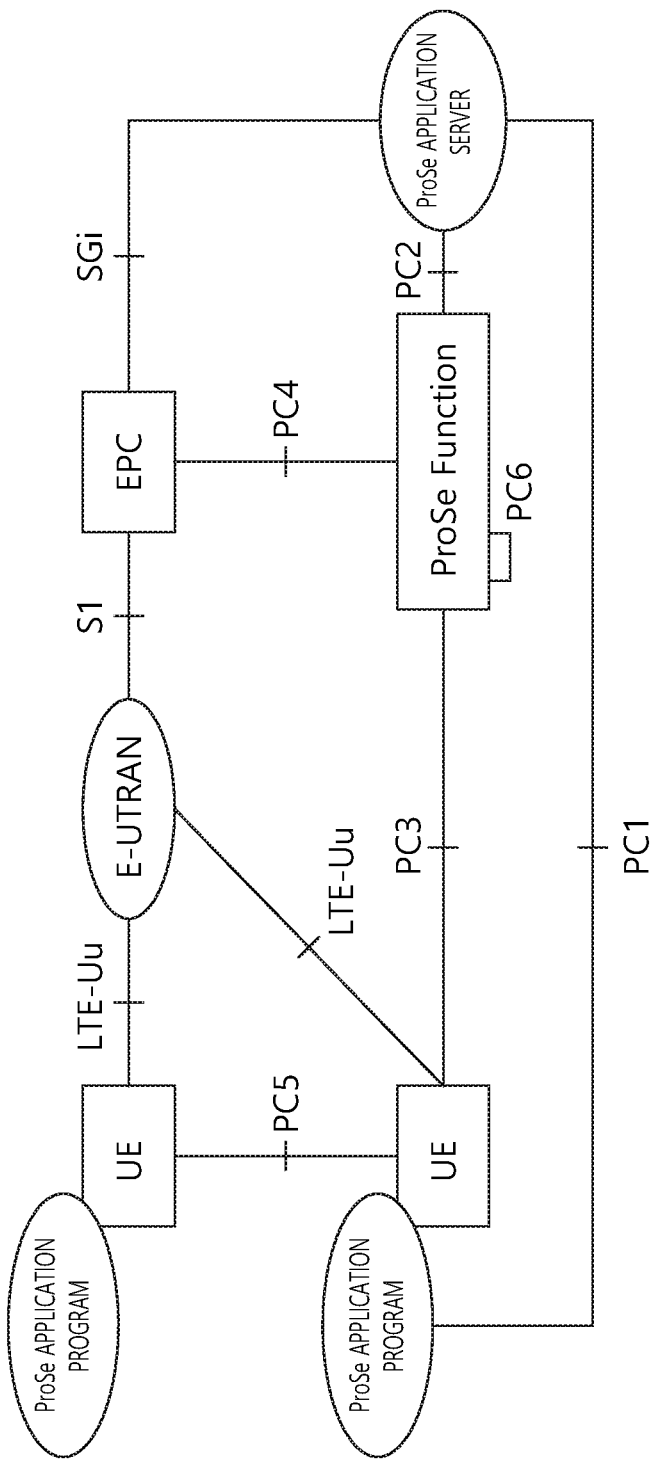
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
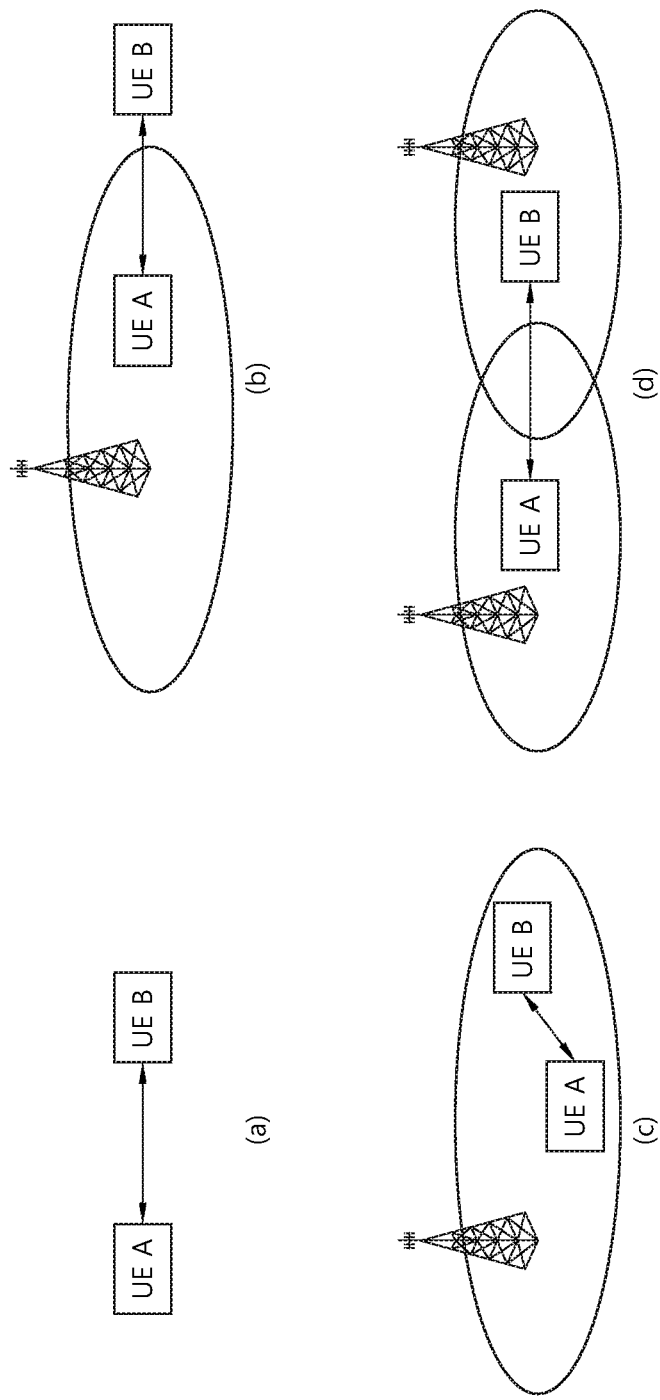
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
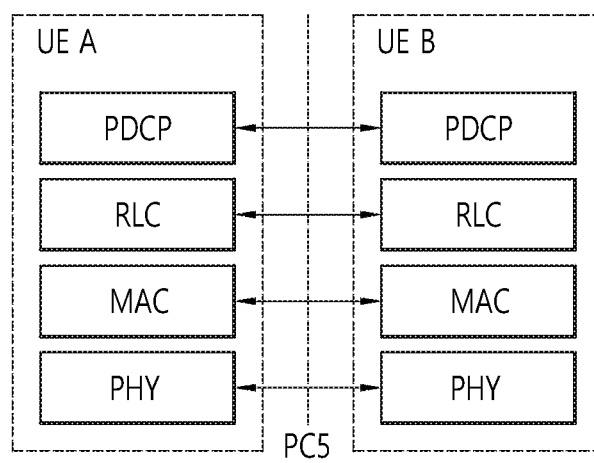
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
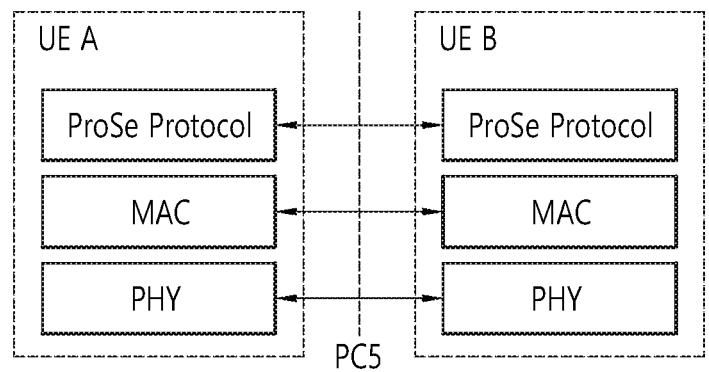
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Figure 13:
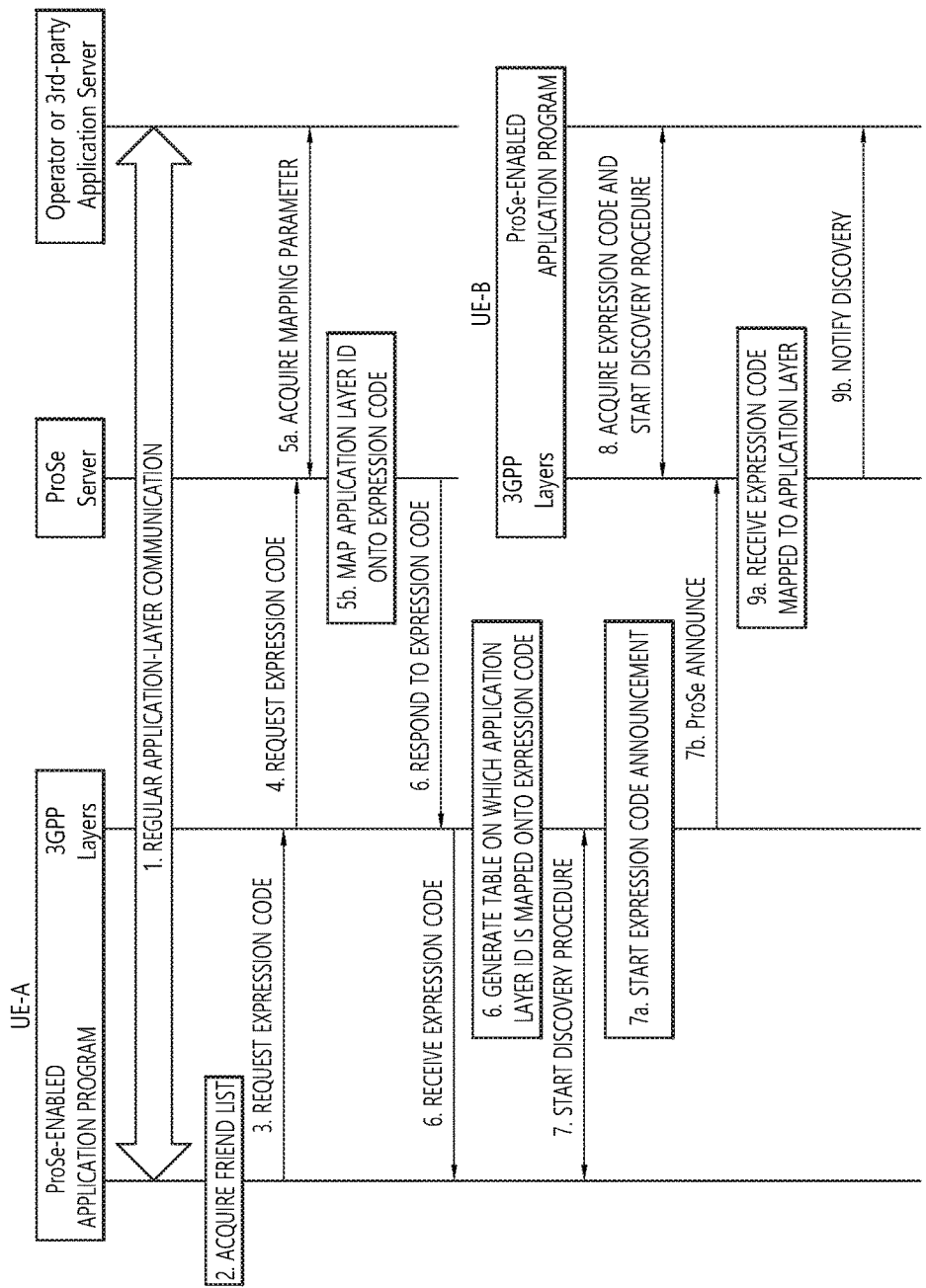
FIG. 13 illustrates an embodiment of a ProSe direct discovery procedure.

FIG. 13 illustrates an embodiment of a ProSe direct discovery procedure.

Referring to FIG. 13, it is assumed in a terminal A and a terminal B that a ProSe-enabled application program is operated, and the terminal A and the terminal B are configured in a friend relationship to each other, that is, a relationship capable of allowing D2D communication with each other in the application program. Hereinafter, the terminal B may be expressed as a friend of the terminal A. For example, the application program may be a social networking program. 3GPP Layers correspond to functions of an application program for using a ProSe discovery service regulated according to 3GPP.

A ProSe direct discovery between the terminal A and the terminal B may perform a following procedure.

1. First, the terminal A performs regular application-Layer communication with an application server. The above communication is performed based on Application programming interface (API).

2. A ProSe enabled application program of the terminal A receives a list of application layer IDs having a friend relationship. The application layer ID may generally be in the form of a network access ID. For example, an application layer ID of the terminal A may have a form such as adam@example.com.

3. A terminal A requests private expression codes for a user and private expression codes for a friend of the user.

4. 3GPP layers transmit an expression code request to a ProSe server.

5. The ProSe server map application layer IDs provided from an operator or a third application server to private expression codes. For example, an application layer ID such as adam@example.com. The mapping may be performed based on parameters (e.g., mapping algorithms, key values, and the like) received from an application service of the network.

6. The ProSe server responds the obtained expression codes to the 3GPP layers. The 3GPP layers report that expression codes with respect to the requested application layer are successively received to the ProSe enabled application program. Further, a mapping table between the application layer IDs and the expression codes are generated.

7. The ProSe enabled application program requests the 3GPP layers to start the discovery procedure. That is, when one of friends is located close to the terminal A and direct communication may be performed, the ProSe enabled application program attempts the discovery. 3GPP layers announce a private expression code of the terminal A (that is, "GTER543$#2FSJ67DFSF" which is a private expression code of adam@example.com in the above example). In mapping of an application layer ID of a corresponding application program and the private expression code, the mapping relationship may be known by the previously received friends, and the mapping may be performed.

8. It is assumed that the terminal B is operating the same ProSe enabled application program as that of the terminal A, and the above steps 3 to 6 may be executed. 3GPP layers included in the terminal B may perform ProSe discovery.

9. When the terminal B receives the above announce from the terminal A, the terminal B determines whether the private expression code included in the announce is known by the terminal B or is mapped to an application layer ID. As illustrated in step 8, since the terminal B performs steps 3 to 6, the terminal B knows a private expression code with respect to the terminal A, mapping of the private expression code to the application layer ID, and which is a corresponding application program. Accordingly, the terminal B may discover the terminal B from the announce of the terminal A. The 3GPP layers in the terminal B announces that adam@example.com is discovered to the ProSe enable application program.

FIG. 13 illustrates a discovery procedure by taking into consideration the terminals A and B, the ProSe server, and the application server. Only an operation side between the terminals A and B is described. The terminal A transmits a signal called the announce (the procedure may refer to announcement), and the terminal B receives the announce to discover the terminal A. That is, a discovery procedure of FIG. 13 in an operation directly related to another terminal among operations performed by each terminal may refer to a single step discovery procedure may refer to a single step discovery procedure in a side of one step.

Figure 14:
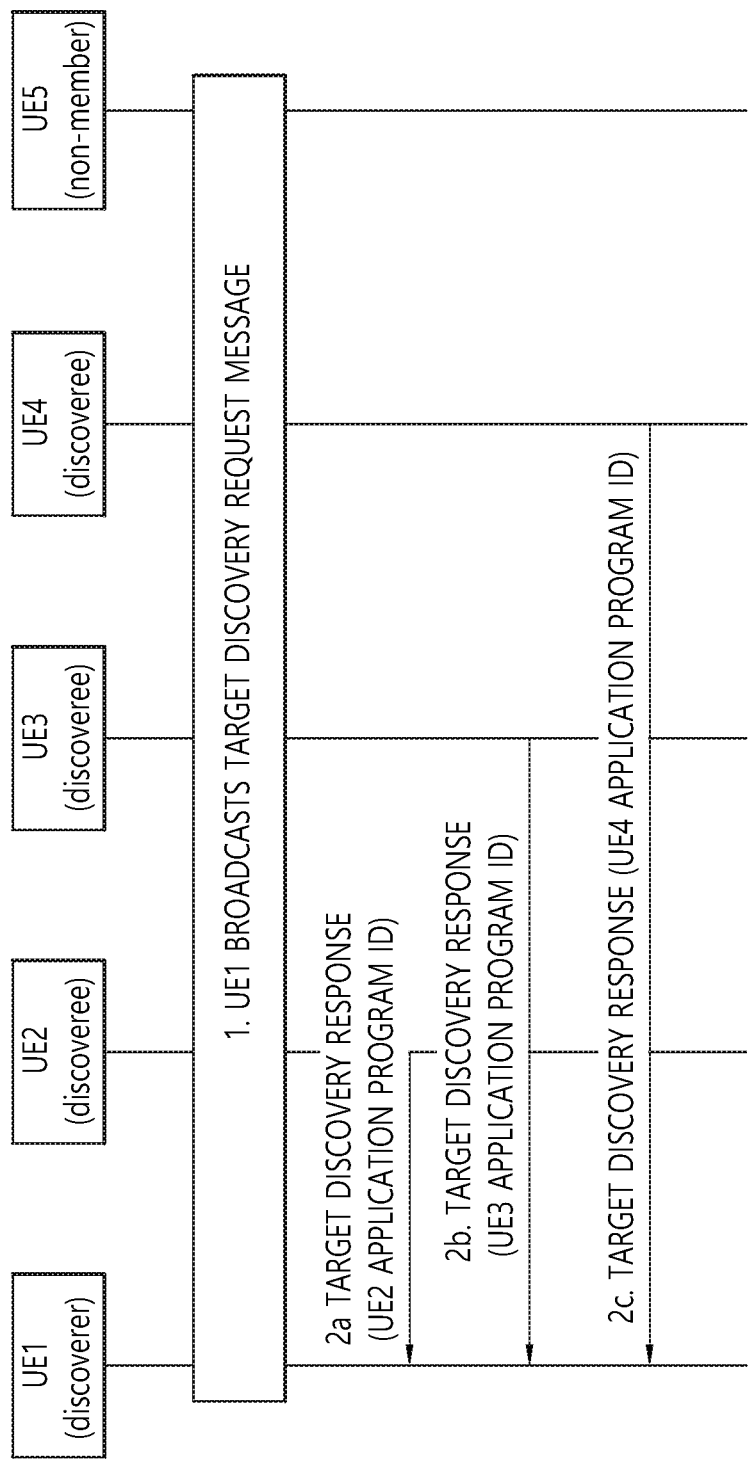
FIG. 14 illustrates another embodiment of a ProSe direct discovery procedure.

FIG. 14 illustrates another embodiment of a ProSe direct discovery procedure.

In FIG. 14, it is assumed that the terminal 1 to the terminal 4 may be included in a specific group communication system enablers (GCSE) group. It is assumed that the terminal 1 is a discoverer and terminals 2, 3, and 4 are a discovery. A terminal 5 is a terminal regardless of a discovery procedure.

The terminal 1 and the terminals 2 to 4 may perform a following operation in a discovery procedure.

First, the terminal 1 broadcasts a targeted discovery request message (hereinafter referred to 'discovery request message' or 'M1') in order to discover whether an optional terminal included in the GCSE group is located around the terminal 1. The targeted discovery request message may include a unique application program group ID or a layer-2 group ID of the specific GCSE group. Further, the targeted discovery request message may include a unique ID of the terminal 1, that is, an application program private ID. The targeted discovery request message may be received by the terminals.

The terminal 5 transmits no response messages. The terminals 2, 3, and 4 included in the GCSE group transmit a targeted discovery response message (hereinafter referred to as a discovery response message or M2) as a response to the targeted discovery request message. The targeted discovery response message may include a unique application program private ID of a terminal transmitting the message.

An operation of terminals in a ProSe discovery procedure illustrated in FIG. 14 will be described. A discoverer (UE 1) transmits the targeted discovery request message, and receives a targeted discovery response message being a response thereto. In addition, if a discoveree (e.g., UE 2) receives the targeted discovery request message, the discoveree transmits a targeted discovery response message as a response thereto. Accordingly, each terminal performs an operation a second step. In the above side, a ProSe discovery procedure of FIG. 14 may refer to a discovery procedure.

In addition to the discovery procedure illustrated in FIG. 14, if the terminal 1 (discoverer) transmits a discovery confirm message (hereinafter may refer to M3) as a response to the targeted discovery response message, this may refer to a third step discovery procedure.

Now, the present invention is described.

It is assumed that a signal based on a D2D operation is transmitted by using resources to be scheduled by a network in a state where a UE has established an RRC connection with the network. However, a situation may occur in which the connection with the network is problematic during the D2D operation, and thus the UE is no longer able to receive from the network the resources scheduled to be used to transmit the signal based on the D2D operation. Therefore, the D2D operation may be stopped.

To facilitate understanding, it is assumed that the UE is in a mode 1, that is, in a mode in which D2D transmission is scheduled by the network. There may be a case where the UE connected to the network has a problem in its connection or cannot obtain scheduling for mode-1 D2D transmission from the network due to a failure in the connection with the network. In this case, the UE cannot perform the mode-1 D2D transmission, and as a result, the D2D transmission is stopped.

More specifically, when the UE intends to establish an RRC connection for D2D transmission, there may be a case where the D2D transmission cannot be initiated due to a failure in the RRC connection. When the network allows the D2D transmission by using only a resource indicated by a dedicated configuration for the UE in the D2D transmission of the UE, if the UE fails in an RRC connection establishment procedure for establishing the RRC connection in an RRC idle state, the UE cannot initiate the D2D transmission until the RRC connection establishment procedure is successful at a later time.

If the D2D transmission is used primarily for public safety, reliability of the D2D transmission is significantly important. Problematically, however, the D2D transmission may be stopped or there may be a situation in which the D2D transmission cannot be initiated. The present invention provides a method and apparatus for minimizing such a situation where the transmission is stopped.

According to the present invention, the D2D transmission operation of the UE may have a mode 1 in which the D2D transmission is performed in a normal situation and a mode 2 in which the D2D transmission is performed in a specific abnormal situation.

As an example of defining the mode 1 and the mode 2, the mode-1 transmission may be defined as transmission of a D2D signal (which implies control information and/or data for the D2D operation) in a resource scheduled by the network. The mode-2 transmission may be defined as transmission of the D2D signal by using a resource defined autonomously by the UE in a specific resource pool. Since the scheduling of the network can be performed by the UE in an RRC connection state in general, the purpose of dividing the mode is to propose an operation of performing the D2D transmission by autonomously determining a resource exceptionally in a situation where the UE cannot be subjected to scheduling from the network for the D2D transmission.

The above definition may be generalized as follows. That is, the mode-1 transmission may imply normal transmission in which the D2D signal is transmitted by using the resource indicated by the network in the normal state, and the mode-2 transmission may imply exceptional transmission in which the D2D signal is transmitted by using the exceptional resource under an exceptional condition other than the normal state. For example, if the network is configured such that the D2D transmission is possible only in the RRC connection state, the mode-1 transmission may imply a normal transmission mode in which the D2D transmission is not allowed when the UE is in the RRC idle state, and the mode-2 transmission may imply an exceptional transmission mode in which the D2D transmission is exceptionally allowed even if the UE is in the RRC idle state.

For another example of defining the mode 1 and the mode 2, the mode-1 transmission may be defined as transmission in which the UE transmits the D2D signal by determining a transmission resource among resources applied to the normal situation and selected from the resources indicated by the network, and the mode-2 transmission may be defined as transmission in which the UE transmits the D2D signal by determining a transmission resource among the resource indicated by the network in the exceptional situation. If the resource indicated by the network is configured to be used by the UE in the RRC idle state, the above definition may be applied when the UE is in the RRC idle state. If the resource indicated by the network is configured to be used by the UE in the RRC connection state, the above definition may be applied when the UE is in the RRC connection state.

The operation in which the UE changes from the mode 1 to the mode 2 according to the above definition is possible only when a D2D transmission resource that can be used in the mode 2 is configured to the UE. The network may configure to the UE the D2D resource that can be used by the UE in the mode 2 through broadcasting or dedicated signaling for the UE.

Hereinafter, a condition of allowing the UE to autonomously perform mode switching from the mode 1 to the mode 2 or from the mode 2 to the mode 1 is described. Although the term 'mode switching' is used hereinafter for convenience of explanation, this is eventually for indicating how to determine a resource used in transmission of the D2D signal.

First, timers that can be used in the present invention are described. The following table describes various timers used in the present invention.

TABLE 2

| Timer | Start | Stop | At expiry |
|---|---|---|---|
| T300 | Transmission of RRCConnectionRequest | Reception of RRCConnectionSetup or RRCConnectionReject message, cell re-selection and upon abortion of connection establishment by upper layers | Perform the procedure such as MAC reset, MAC unset, RLC re-establishment, etc. |
| T301 | Transmission of RRCConnectionReestabilshmentRequest | Reception of RRCConnectionReestablishment or RRCConnectionReestablishmentReject message as well as when the selected cell becomes unsuitable | Go to RRC_IDLE state |
| T304 | Reception of RRCConnectionReconfiguration message | Criterion for successful completion of handover to EUTRA or cell change order is met | Initiate the RRCconnection re-establishment procedure in case of cell change through handover |
| T310 | Upon detecting physical layer problems for the PCell | Trigger handover, and receive indication information for initiating RRC connection re-establishment procedure | Go to RRC_IDLE state, or initiate the RRC connection re-establishment procedure |
| T311 | Upon initiating the RRCconnection reestablishmentmprocedure | Selection of a suitable E-UTRA cell or a cell using another RAT. | Enter RRC_IDLE state |

Now, the condition of allowing the UE to autonomously perform the mode change from the mode 1 to the mode 2 is described. Hereinafter, it is assumed that the UE is in the mode 1.

First, upon failing in an RRC connection establishment, the UE may change the mode from the mode 1 to the mode 2. If the UE attempts the RRC connection establishment for the purpose of performing D2D transmission but fails in the RRC connection establishment, the UE may change the mode to the mode 2 for the purpose of initiating the D2D transmission.

A specific timer may be started when the UE initiates the RRC connection establishment. This timer is stopped when the RRC connection establishment is successful, and upon an expiry of the timer, the UE may determine that the RRC connection establishment has failed. When the timer is expired, the UE may initiate/resume the D2D transmission by changing the D2D operation mode from the mode 1 to the mode 2.

A timer value used to determine that the UE fails in the RRC connection establishment determines a time at which the UE initiates/resumes the D2D transmission when the RRC connection establishment of the UE has failed. In general, it is not desirable to set the timer value to a significantly short value in order for the UE to be sufficiently ensured for the RRC connection establishment attempt. However, when the timer value is set to be long, a time of initiating/resuming the D2D transmission is also delayed when the UE fails in the RRC connection establishment. In order to prevent this problem, the D2D transmission may be initiated/resumed in advance before the UE fails in the RRC connection establishment. In this case, when the UE initiates the RRC connection establishment procedure, an additional timer may be started at the same time of starting the existing timer. The additional timer may have a shorter value than the existing timer. If the additional timer is expired before the RRC connection establishment fails, the mode may be changed from the mode 1 to the mode 2, and accordingly, the D2D transmission may be initiated/resumed more promptly.

Assume that the timer is $T300_{D2D}$. A time indicated by the $T300_{D2D}$ may be shorter than a time indicated by the T300 described in Table 2. Then, when the $T300_{D2D}$ is expired, the UE may autonomously perform mode switching from the mode 1 to the mode 2 instead of regarding that the RRC connection establishment has failed. As a result, the UE may autonomously perform the mode switching from the mode 1 to the mode 2 before a declaration of the RRC connection establishment failure.

When the network performs signaling on a D2D transmission resource through system information to be broadcast, upon the expiry of the T300, the UE may perform mode-2 transmission in which a D2D signal is transmitted by using a resource that can be used in an exceptional condition (e.g., an exceptional resource) among resources indicated by the system information to be broadcast by the network, instead of the mode-1 transmission in which the D2D signal is transmitted by using the resource indicated by the system information to be broadcast. This is described below with reference to FIG. 16.

When the network does not perform signaling on the D2D transmission resource through the broadcast, upon the expiry of the T300, the UE may perform the mode-2 transmission in which the D2D signal is transmitted in an RRC idle state by using the resource which can be used in the exceptional condition (e.g., the exceptional resource) among the resources indicated by the network, instead of the mode-1 transmission which is not allowed in the RRC idle state.

The timer value may be signaled by the network. Alternatively, the timer value may be predetermined. The network may indicate whether the UE is capable of applying the operation explained in regards to the timer $T300_{D2D}$. Alternatively, if the RRC connection re-establishment has failed, the UE may change the mode from the mode 1 to the mode 2.

Alternatively, the UE may change the mode from the mode 1 to the mode 2 upon an expiry of a timer started upon detection of a physical layer problem. Assume that the timer is $T310_{D2D}$. A time indicated by the $T310_{D2D}$ may be shorter than a timer indicated by the T310 described in Table 2. Then, the UE may autonomously perform mode switching from the mode 1 to the mode 2 without having to declare a radio link failure (RLF) upon an expiry of the $T310_{D2D}$. More specifically, after the expiry of the $T310_{D2D}$ and before the expiry of the T310, that is, during the T310 is running, the mode-2 transmission in which a D2D signal is transmitted by using an exceptional resource under an exceptional condition may be performed, instead of the mode-1 transmission in which the D2D signal is transmitted in a resource scheduled by the network. This is described below with reference to FIG. 15. As a result, the UE may autonomously perform mode switching from the mode 1 to the mode 2 before the declaration of the RLF. A value of the timer may be signaled by the network. Alternatively, the value of the timer may be predetermined. The network may indicate whether the UE can apply the operation described in regards to the timer $T310_{D2D}$ through system information.

Alternatively, the UE may change the mode from the mode 1 to the mode 2 upon an expiry of a timer started upon reception of a handover command. The additional timer may be $T304_{D2D}$. A timer indicated by the $T304_{D2D}$ may be shorter than a timer indicated by the T304 described in Table 2. Then, the UE does not declare the handover failure upon an expiry of the $T304_{D2D}$, and may autonomously perform mode switching from the mode 1 to the mode 2 before the handover failure is declared upon an expiry of the T304. The value of the timer may be signaled by the network or may be predetermined. The network may indicate whether the UE can apply the operation described in regards to the timer $T304_{D2D}$ through the system information.

Alternatively, the UE may perform the mode switching from the mode 1 to the mode 2 when the RRC connection re-establishment procedure is initiated due to a handover failure, a radio link failure, an RRC connection reconfiguration failure, or the like.

Alternatively, when the UE initiates the RRC connection establishment, the UE may perform the mode switching from the mode 1 to the mode 2.

In a D2D operation, an operation in which the UE performs switching from the mode 1 to the mode 2 may be performed only when the D2D signal to be transmitted contains specific information. For example, the operation may be allowed to the UE if the D2D transmission is communication for public safety. For another example, the operation may be allowed to the UE if the D2D transmission intends to exchange a message including vehicle navigation information/safety information/urgency information or the like through direct communication between vehicles. According to a traffic type or a traffic quality of service (QoS) requirement, a condition or rule for indicating whether the operation is allowed for certain traffic is possibly configured to the UE.

Different mode switching conditions are possibly applied according to information of a D2D signal to be transmitted by the UE. For example, a mode switching condition used by the UE when the D2D signal delivers information for controlling the D2D operation between two UEs may be different from a mode switching condition used by the UE when the D2D signal delivers user data such as voice and video between the two UEs. Since control information has a higher priority than user data in general, a more active mode switching condition (e.g., allowing of mode switching when attempting an RRC connection establishment) may be applied to minimize a D2D transmission interruption or a D2D transmission initiation delay of the D2D signal containing the control information.

Hereinafter, a time duration for a condition for switching a mode from a mode 1 to a mode 2 is described. The time duration may be implemented by a timer.

For example, the timer may be started when a UE has data to be transmitted through D2D transmission. Alternatively, the timer may be started when the UE receives the data to be transmitted through the D2D transmission from a higher layer. Alternatively, the timer may be started when the UE detects a physical layer problem. Alternatively, the timer may be started when the UE detects a radio link failure. The timer is possibly applied to specific traffic or traffic which satisfies a specific QoS requirement. That is, the timer is possibly applied to traffic having a specific priority by determining a traffic priority. For example, the timer is possibly applied in an exceptional case which occurs when intending to transmit a message including vehicle navigation information/safety information/emergency information or the like through direct communication between vehicles. It is also possible to apply a different timer value according to a traffic type or a QoS requirement. One of conditions for starting the aforementioned various timers may be used, or a plurality of the conditions may be used in combination. Mode switching from the mode 1 to the mode 2 may be performed upon an expiry of the time duration based on the timer.

Meanwhile, one or a plurality of conditions may be considered to stop the timer.

For example, the timer is stopped when the UE has a D2D transmission opportunity and transmits resultant data through D2D transmission. Alternatively, the timer is stopped when an RRC connection including a D2D configuration is established to allow the D2D transmission to the UE.

A value of the timer may be signaled by the network. For example, the value of the timer may be broadcast by the network or may be reported through a dedicated signal for the UE. Alternatively, the value of the timer may be predetermined for the UE. If the value of the timer is signaled by the network, the timer value predetermined for the UE may be replaced with a timer value signaled by the network.

Now, resource selection is described when performing the mode switching from the mode 1 to the mode 2.

When the UE decides to autonomously perform the mode switching from the mode 1 to the mode 2, if the UE has valid resource information for the mode 2, the UE uses a resource for the mode 2 defined by the resource information. Herein, the valid resource information may imply an exceptional resource used to transmit a D2D signal under an exceptional condition when the UE is in the RRC connection state. Alternatively, the valid resource information may mean an exceptional resource applied for D2D signal transmission only under the exceptional condition among resources indicated by system information to be broadcast by the network, if the UE is in the RRC idle state. The valid resource information may be broadcast similarly to SIB by the network, or may be provided through a dedicated signal for the UE.

Alternatively, when the UE determines to autonomously perform the mode switching from the mode 1 to the mode 2, if the UE does not have valid resource information for the mode 2, the UE may use a resource predetermined for mode-2 transmission. The predetermined resource may mean not the resource signaled by the network such as an eNB but a resource predetermined through a universal subscriber identity module (USIM) of the UE or an internal storage medium or the like.

If a condition for the mode switching from the mode 1 to the mode 2 is satisfied and if the UE receives or transmits data for the D2D operation through a valid resource for the mode 1, the UE may defer the mode switching from the mode 1 to the mode 2 until the resource is no longer valid or until scheduled D2D transmission/reception is entirely complete.

Now, an example of applying the aforementioned present invention to the UE supporting the D2D operation is described in greater detail. First, a case of performing mode-2 transmission is described in which a D2D signal is transmitted by using an exceptional resource under an exceptional condition, instead of mode-1 transmission in which the D2D signal is transmitted in a resource scheduled by a network while the T310 is running. It is assumed hereinafter that the UE is inside a cell coverage at a frequency used in D2D communication.

Figure 15:
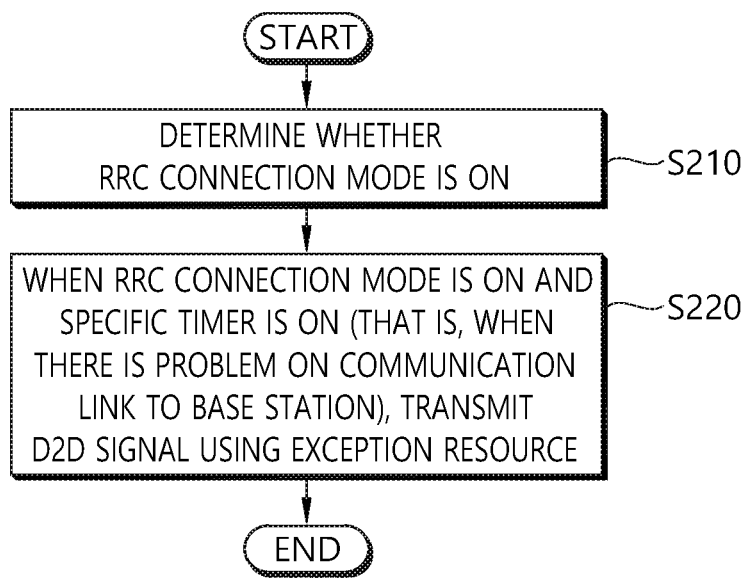
FIG. 15 illustrates a D2D operation method of a UE according to an embodiment of the present invention.

FIG. 15 illustrates a D2D operation method of a UE according to an embodiment of the present invention.

Referring to FIG. 15, the UE determines whether it is an RRC connection mode (S210).

If it is the RRC connection mode and a specific timer is running, the UE transmits a D2D signal by using an exceptional resource (S220). Herein, the D2D signal may be control information and/or data for a D2D operation. Further, the specific timer may be the aforementioned T310 or T311 of Table 2. That is, the specific timer may be a timer started when the UE detects a physical layer problem or a timer started when a cell selection process is initiated after a radio link failure is declared or a timer started when a cell is selected and an RRC connection re-establishment request message is transmitted after the radio link failure is declared. Accordingly, when it is said that the specific timer is running, it may mean that there is a problem in a communication link between the UE and an eNB.

For example, the UE may transmit the D2D signal by using the exceptional resource until the T310 is started and expired upon detection of the physical layer problem as to a primary cell or until the T311 is started and expired by initiating an RRC connection re-establishment procedure upon occurrence of a radio link failure (RLF).

The exceptional resource may be included in system information to be broadcast by the primary cell in which the physical layer problem or the RLF is detected. Alternatively, the exceptional resource may be included in system information to be broadcast by a cell in which the UE initiates the RRC connection re-establishment procedure.

The following table exemplifies the system information including the exceptional resource.

TABLE 3

```
-- ASN1START
SystemInformationBlockType18-r12 ::= SEQUENCE {
    commConfig-r12                    SEQUENCE {
        commRxPool-r12                SL-CommRxPoolList-r12,
        commTxPoolNormalCommon-r12    SL-CommTxPoolList-r12       OPTIONAL,  -- Need OR
```

TABLE 3-continued

| commTxPoolExceptional-r12 | SL-CommTxPoolList-r12 | OPTIONAL,-- Need OR |
|---|---|---|
| commSyncConfig-r12 | SL-SyncConfigList-r12 | OPTIONAL-- Need OR |
| } | | OPTIONAL,-- Need OR |
| lateNonCriticalExtension | OCTET STRING | OPTIONAL. |
| ... | | |

}
-- ASN1STOP

In Table 3 above, 'commRxPool' indicates resources which allow the UE to receive the D2D signal only during the RRC idle state and the RRC connection state. 'commTxPoolNormalCommon' indicates resources which allow the UE to transmit a signal based on D2D communication in the RRC idle state or resources which allow the UE to transmit the signal based on the D2D operation through not the primary frequency but other frequencies in the RRC connection state. 'commTxPoolExceptional' indicates resources which allow the UE to transmit the signal based on the D2D communication under an exceptional condition. That is, although the UE transmits the signal based on the D2D operation in general by using resources indicated by 'commTxPoolNormalCommon', in an exceptional condition, for example, if it is the RRC connection mode and the specific timer is running as described in FIG. 15, the signal based on the D2D communication may be transmitted by using an exceptional resource, that is, a resource indicated by 'commTxPoolExceptional'. The UE may stop the using of the exceptional resource upon determining that a communication link is recovered. Herein, the recovering of the communication link may mean that a physical layer problem is solved or an RRC connection re-establishment procedure is complete.

Next, an example of applying a method of performing mode-2 transmission is described in which a D2D signal is transmitted by using an exceptional resource applied only under an exceptional condition among resources indicated by system information to be broadcast by a network, instead of mode-1 transmission in which a D2D signal is transmitted by using a common resource applied under a normal situation among the resources indicated by the system information to be broadcast by the network after the expiry of the T300. It is assumed that the UE is within a cell coverage at a frequency used in D2D communication.

Figure 16:
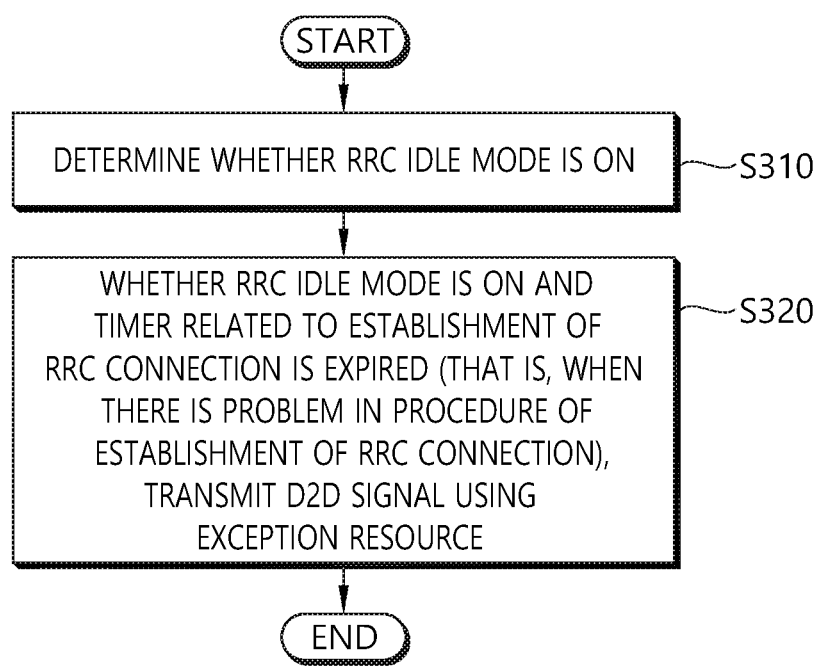
FIG. 16 illustrates a D2D operation method of a UE according to another embodiment of the present invention.

FIG. 16 illustrates a D2D operation method of a UE according to another embodiment of the present invention.

Referring to FIG. 16, the UE determines whether it is an RRC idle mode (S310).

If it is the RRC idle mode and a an RRC connection establishment timer is expired, the UE transmits a D2D signal by using an exceptional resource (S320). Herein, the RRC connection establishment timer may be the aforementioned T300 of Table 2. That is, the UE may transmit the D2D signal by using the exceptional resource if an RRC connection establishment procedure is problematic. In addition, the D2D signal may be control information and/or data for the D2D operation.

For example, the UE may transmit an RRC connection request (RRCConnectionRequest) to a cell to transition to an RRC connection state while performing the D2D operation in the RRC idle state. The T300 is started when the RRC connection request is transmitted. However, if the UE fails to receive a message such as RRCConnectionSetup' or 'RRCConnectionReject' from a cell before the expiry of the T300, the UE performs a procedure such as a MAC reset, a MAC unset, an RLC re-establishment, or the like. In this case, there is a need to specify which resource is used for the D2D operation performed by the UE.

That is, there is a need to specify which resource is used by the UE to perform the D2D operation, more specifically, D2D communication, until 'RRCConnectionReconfiguration' including a configuration for the D2D operation is received from a cell after the expiry of the T300.

The present invention proposes that the UE performs D2D communication during the aforementioned duration by using the exceptional resource if information regarding the exceptional resource is included in system information which is broadcast by a cell. The cell may be a cell in which the UE initiates the RRC connection establishment procedure. That is, the cell may be a target cell when the UE transmits an RRC connection request.

System information including the exception resource is shown in Table 3. A terminal transmits a signal for D2D operation using resources indicated by 'commTxPoolNormalCommon' in Table 3. However, in an exceptional condition, for example, when an RRC idle mode is on and a timer related to establishment of RRC connection is expired, as described with reference to FIG. 16, the terminal may transmit the signal for (D2D) operation using an exception resource, that is, the resource indicated by 'commTxPoolExceptional' in Table 3. More specifically, before receiving 'RRCConnectionReconfiguration' containing settings for the (D2D) operation after the timer related to establishment of RRC connection is expired, the terminal may transmit the signal for (D2D) operation using the resource indicated by commTxPoolExceptional' in Table 3. When receiving D2D settings dedicated to the terminal in response to completion of establishment of RRC connection or when receiving a command requiring cancelation of RRC connection, the terminal may stop using the exception resource.

Figure 17:
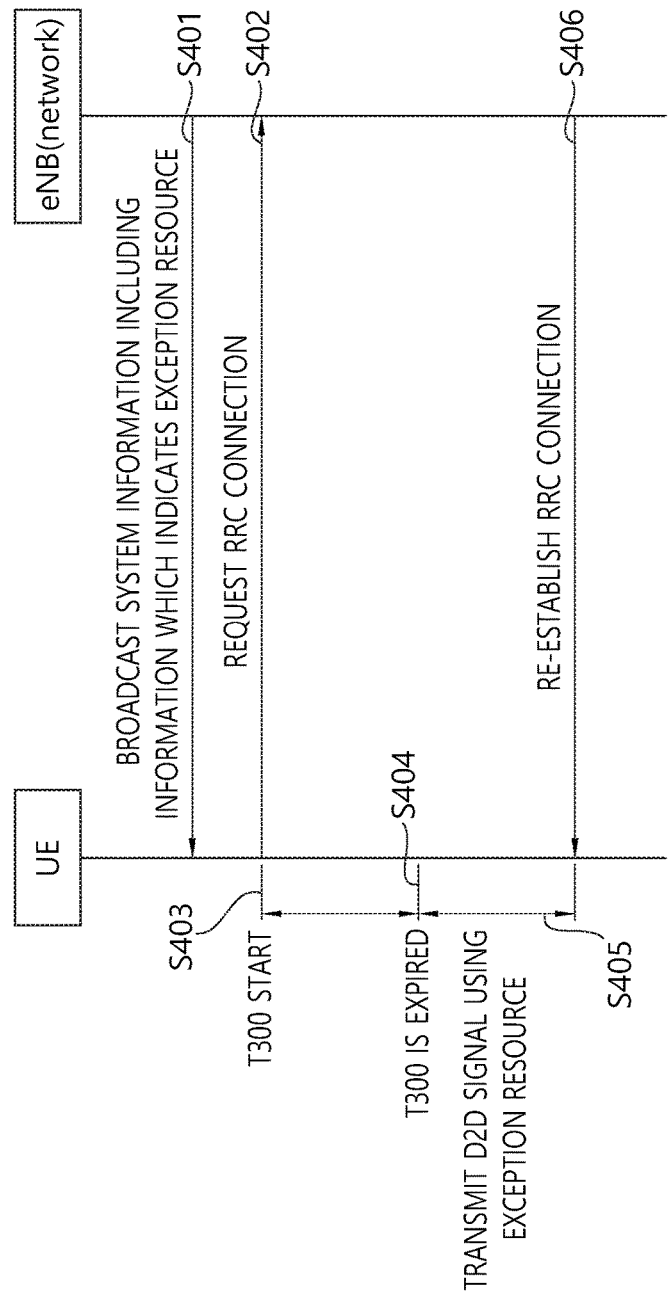
FIG. 17 illustrates an example of applying the method of FIG. 16 to a UE in an RRC idle state.

FIG. 17 illustrates an example of applying the method of FIG. 16 to a UE in an RRC idle state.

Referring to FIG. 17, a network broadcasts system information including information indicating an exceptional resource (S401). The system information is described above in Table 3.

The UE in the RRC idle state transmits an RRC connection request to the network (S402).

Upon transmission of the RRC connection request, the T300 of the UE is started (S403).

The UE may not be able to receive a message such as an RRC connection configuration or the like from the network during a time indicated by the T300. That is, the T300 is expired (S404).

The UE transmits a D2D signal by using the exceptional resource during the time from a time at which the T300 is expired until an RRC connection re-configuration is received from the network (S405).

Hereinafter, a condition of allowing the UE to autonomously perform mode switching from the mode 2 to the mode 1 is described.

For example, it is assumed that the UE autonomously performs the mode switching from the mode 1 to the mode 2 to enable D2D transmission in a situation where scheduling cannot be obtained from the network. In this case, if the situation is changed such that the UE can obtain the scheduling from the network, the UE may need to perform again the mode switching from the mode 2 to the mode 1.

As such, the condition for allowing the mode switching from the mode 2 to the mode 1 may consider one or a plurality of the following cases.

The UE operating in the mode 2 may perform the mode switching from the mode 2 to the mode 1 upon an expiry of a predetermined time duration. For example, after performing the mode switching from the mode 1 to the mode 2, the UE may autonomously perform the mode switching again from the mode 2 to the mode 1 upon the expiry of the predetermined time duration.

Alternatively, in case of being recovered from a cause by which the UE performs the mode switching from the mode 1 to the mode 2, that is, various failures, the UE may perform the mode switching from the mode 2 to the mode 1. For example, when an RRC connection re-establishment is complete, the UE may perform the mode switching from the mode 2 to the mode 1.

Now, a time duration is described for a condition for the mode switching from the mode 2 to the mode 1. The time duration may be implemented by a timer.

When the UE autonomously performs the mode switching from the mode 1 to the mode 2, the timer may be started. A condition for stopping the timer may need to satisfy at least one or two conditions described below.

If the UE receives a dedicated D2D configuration for the UE from the network, the timer may be stopped. This condition may imply that the timer is stopped upon detecting that the UE is controlled by the network.

Alternatively, the timer may be stopped when the UE receives a dedicated configuration (i.e., not the dedicated D2D configuration) from the network. The UE may receive the dedicated configuration through a higher layer such as RRC or MAC or may receive the dedicated configuration through a lower layer such as a physical layer. This condition may also imply that the timer is stopped upon detecting that the UE is controlled by the network.

When the timer is stopped, the UE in the RRC connection state returns to the mode 1 from the mode 2.

Meanwhile, before an expiry of a certain maximum time duration allowed for the UE, the aforementioned problematic situation, that is, the occurrence of RLF or the physical layer problem or the like, may be solved. In this case, it may be simpler and better to determine whether to return to the mode 1 on the basis of whether the maximum time duration is expired (by using the timer) even if the UE can immediately return to the mode 1 from the mode 2. This is because frequent mode switching may cause stopping of the D2D operation of the UE. Accordingly, a condition of stopping the timer is not necessarily specified.

A timer operation is described in regards to a UE mobility (cell selection or cell reselection or handover or the like). The UE may start a timer B in a cell A on the basis of which the D2D operation is performed. Further, the UE may change the cell (e.g., from the cell A to a cell B) due to the mobility. In such a movement process, the timer B may be continuously running to allow the UE to continuously operate in the mode 2. In doing so, mode switching which may cause the stopping of the D2D operation may be prevented from occurring excessively frequently.

For another example, it is assumed that the UE starts timer B in the cell B on the basis of which the D2D operation is performed. Further, it is assumed that the UE changes the cell due to the mobility. In this case, the UE may stop the timer B to reset the timer B to strictly conform to a network configuration in a new cell.

If the condition for the mode switching from the mode 2 to the mode 1 is satisfied and if the UE receives or transmits data for the D2D operation through a valid resource for the mode 2, the UE may defer the mode switching from the mode 2 to the mode 1 until the resource is no longer valid or mode-scheduled D2D transmission/reception is complete.

Meanwhile, although the UE is configured such that a resource for D2D transmission is scheduled for the network, there may be a case where the UE cannot be subjected to scheduling from the network even if there is data to be transmitted with D2D. As a result, D2D transmission may be stopped since transmission opportunities of the UE are not available, or the D2D transmission may not be started. Such a phenomenon may eventually cause stopping of the D2D operation, which may result in a problem in reliability of the D2D operation.

Figure 18:
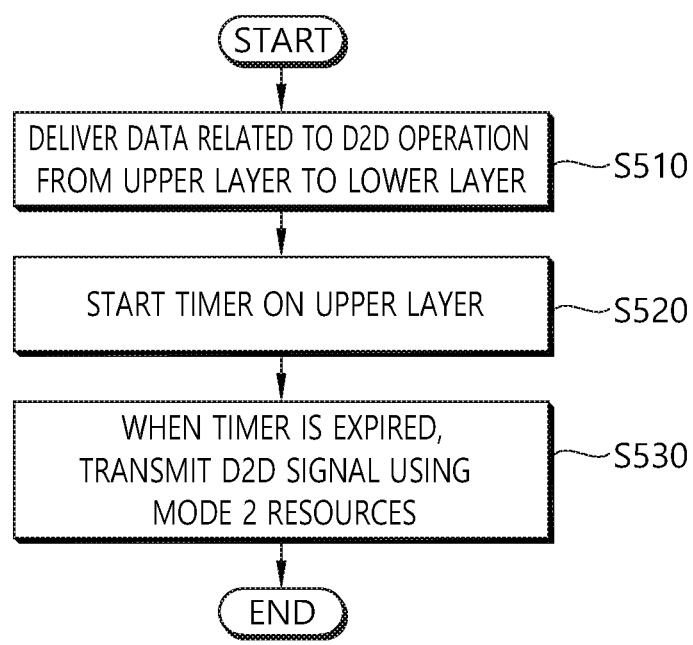
FIG. 18 illustrates a D2D operation method of a UE according to an embodiment of the present invention.

FIG. 18 illustrates a D2D operation method of a UE according to an embodiment of the present invention.

Referring to FIG. 18, the UE delivers data related to a D2D operation from a higher layer to a lower layer (S510). The data may be a service data unit (SDU). Herein, the higher layer may be an RRC layer. Further, the lower layer may be a layer 2 such as PDCP, RLC, and MAC layers. It is assumed that the UE is set to a mode 1.

The UE starts a timer in the lower layer (S520). In order to transmit the data related to the D2D operation, the UE may deliver the data such as the SDU from the higher layer to the lower layer. Whenever the higher layer delivers the data related to the D2D operation to the lower layer, the lower layer starts the timer. The timer may be defined, for example, in the PDCP layer. In this case, a time indicated by the timer needs to be shorter than a time indicated by a discard timer (discardTimer) used to determine the discarding of the SDU. The timer is stopped when the SDU is successfully transmitted to another UE through the D2D operation.

When the timer is expired instead of being stopped, the UE transmits a D2D signal by using mode-2 resources (S530). The mode-2 resources may be the exceptional resource mentioned above in FIG. 15 and FIG. 16. Alternatively, the mode-2 resources may be resources which are predetermined for the UE or which can be selected autonomously from a predetermined resource pool.

For example, the UE may regard that a condition of switching from the mode 1 to the mode 2 is satisfied upon an expiry of the timer. Then, after the expiry of the timer, the D2D signal may be transmitted by using the mode-2 resources.

Alternatively, even if the timer is expired, the UE may regard that the mode 1 is set without alternation, but may use the mode-2 resources until a corresponding SDU is successfully transmitted.

Figure 19:
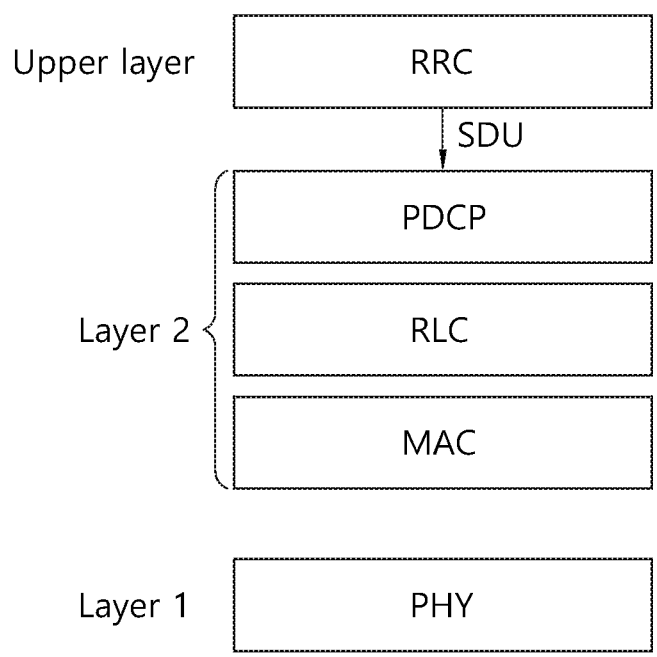
FIG. 19 illustrates an example of applying the method of FIG. 18.

FIG. 19 illustrates an example of applying the method of FIG. 18.

Referring to FIG. 19, a UE transmits an SDU from an RRC layer as a higher layer to a PDCP layer as a lower layer. In this case, a timer is started in the PDCP layer. When the UE transmits the SDU to a different UE through a D2D operation within a time indicated by the timer, the timer is stopped. On the other hand, if the SDU is not transmitted to the different UE through the D2D operation within the time, the timer is eventually expired.

In this case, instead of discarding the SDU, the UE may transmit the SDU by using mode-2 resources.

Figure 20:
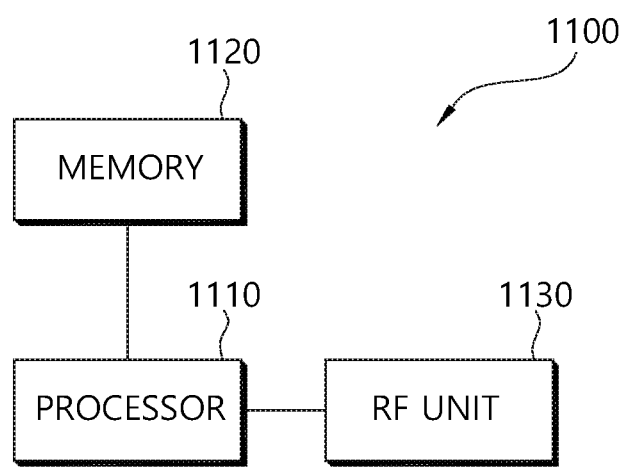
FIG. 20 is a block diagram of a UE according to an embodiment of the present invention.

FIG. 20 is a block diagram illustrating a terminal which implements an embodiment of the present disclosure.

Referring to FIG. 20, a terminal 1100 includes a processor 1110, a memory 1120, and a Radio Frequency (RF) unit 1130. The processor 1110 implements the proposed function, procedure, and/or method. For example, the processor 1110 may deliver data related to (D2D) operation from an upper layer to a lower layer from among multiple protocol layers of the terminal. The processor 1110 starts a timer when the data is delivered, and the processor 1110 transmits a D2D signal using an exception resource when the timer is expired.

The RF unit 1130 is connected to the processor 1110 and sends and receives radio signals.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for performing a transmission for data related to device-to-device (D2D) operation in a wireless communication system, the method performed by a user equipment (UE) and comprising:
   performing the transmission on a first type resource;
   starting a first timer and a second timer when receiving a handover command,
   wherein a handover failure is declared when the first timer expires,
   wherein the second timer is a timer which expires prior to the first timer,
   wherein applying information, which informs whether the UE applies operation for the second timer or not, is received from a network via broadcasted system information; and
   performing the transmission on the first type resource or a second type resource based on whether the second timer expires while the first timer is running and whether the data is related to a direct communication between vehicles,
   wherein the first type resource is scheduled by a base station (BS), and the second type resource is autonomously selected by the UE in a resource pool,
   wherein if the second timer does not expire, the UE performs the transmission on the first type resource, and
   if the second timer expires,
      if the data is related to the direct communication between vehicles, the UE performs the transmission on the second type resource even though the handover failure is not declared, and
      if the data is not related to the direct communication between vehicles, the UE performs the transmission on the first type resource until the first timer expires and the handover failure is declared.

2. A user equipment (UE) for performing a transmission for data related to device-to-device (D2D) operation, the UE comprising:
   a Radio Frequency (RF) unit that transmits and receives a wireless signal; and
   a processor configured to operate in conjunction with the RF unit,
   wherein the processor is configured to:
   perform the transmission on a first type resource;
   start a first timer and a second timer when receiving a handover command,
   wherein a handover failure is declared when the first timer expires,
   wherein the second timer is a timer which expires prior to the first timer,
   wherein applying information, which informs whether the UE applies operation for the second timer or not, is received from a network via broadcasted system information; and
   performing the transmission on the first type resource or a second type resource based on whether the second timer expires while the first timer is running and whether the data is related to a direct communication between vehicles,
   wherein the first type resource is scheduled by a base station (BS), and the second type resource is autonomously selected by the UE in a resource pool,
   wherein if the second timer does not expire, the UE performs the transmission on the first type resource, and
   if the second timer expires,
      if the data is related to the direct communication between vehicles, the UE performs the transmission on the second type resource even though the handover failure is not declared, and
      if the data is not related to the direct communication between vehicles, the UE performs the transmission on the first type resource until the first timer expires and the handover failure is declared.

* * * * *